United States Patent
Hintermeir

(10) Patent No.: US 11,554,798 B2
(45) Date of Patent: Jan. 17, 2023

(54) METHOD FOR CLEANING AN AIR DUCT, AND AIR INTAKE SYSTEM

(71) Applicant: SIEMENS MOBILITY GMBH, Munich (DE)

(72) Inventor: Stefan Hintermeir, Aschau I. Ch (DE)

(73) Assignee: Siemens Mobility GmbH, Munich (DE)

(*) Notice: Subject to any disclaimer, the term of this patent is extended or adjusted under 35 U.S.C. 154(b) by 420 days.

(21) Appl. No.: 16/640,844

(22) PCT Filed: May 18, 2018

(86) PCT No.: PCT/EP2018/063060
§ 371 (c)(1),
(2) Date: Feb. 21, 2020

(87) PCT Pub. No.: WO2019/037909
PCT Pub. Date: Feb. 28, 2019

(65) Prior Publication Data
US 2021/0362754 A1    Nov. 25, 2021

(30) Foreign Application Priority Data
Aug. 21, 2017 (DE) .......................... 102017214514

(51) Int. Cl.
   *B61D 27/00*         (2006.01)
   *B08B 9/035*         (2006.01)
   *B08B 13/00*        (2006.01)
   *F01P 11/06*         (2006.01)

(52) U.S. Cl.
CPC .......... *B61D 27/0018* (2013.01); *B08B 9/035* (2013.01); *B08B 13/00* (2013.01); *B08B 2209/032* (2013.01); *F01P 11/06* (2013.01)

(58) Field of Classification Search
CPC . B08B 9/035; B08B 2209/032; F24F 2221/22
See application file for complete search history.

(56) References Cited

U.S. PATENT DOCUMENTS

| | | | |
|---|---|---|---|
| 5,561,602 A | 10/1996 | Bessler et al. | |
| 6,432,152 B2 | 8/2002 | Frerich | |
| 9,677,781 B2 | 6/2017 | Breu et al. | |
| 2005/0169821 A1 | 8/2005 | Boschert et al. | |

(Continued)

FOREIGN PATENT DOCUMENTS

| | | |
|---|---|---|
| DE | 137460 A1 | 9/1979 |
| DE | 3314039 A1 | 10/1984 |

(Continued)

OTHER PUBLICATIONS

Machine translation: EP2368733A2; Kunz et al. (Year: 2011).*

*Primary Examiner* — Natasha N Campbell
(74) *Attorney, Agent, or Firm* — Laurence A. Greenberg; Werner H. Stemer; Ralph E. Locher

(57) ABSTRACT

A method for cleaning an air duct, in particular an air duct of a rail vehicle. The need to cool at least one load connected to the air duct is determined, the need to clean the air duct is determined, and a cleaning process of the air duct is initiated if there is no or a low need to cool the at least one load connected to the air duct and if there is a need to clean the air duct. There is also described an air intake system.

7 Claims, 1 Drawing Sheet

(56) References Cited

U.S. PATENT DOCUMENTS

2014/0117977 A1    5/2014  Celidonia et al.
2014/0261259 A1    9/2014  Sullivan et al.

FOREIGN PATENT DOCUMENTS

| | | | |
|---|---|---|---|
| DE | 29623613 | U1 | 12/1998 |
| DE | 10012766 | A1 | 9/2001 |
| DE | 10213195 | A1 | 10/2003 |
| DE | 102010010867 | A1 | 9/2011 |
| EP | 2368733 | A2 | 9/2011 |
| EP | 2943664 | B1 | 3/2017 |
| JP | H02130216 | A | 5/1990 |
| RU | 2455181 | C2 | 7/2012 |
| WO | 2008107429 | A1 | 9/2008 |

\* cited by examiner

METHOD FOR CLEANING AN AIR DUCT, AND AIR INTAKE SYSTEM

BACKGROUND OF THE INVENTION

Field of the Invention

The invention relates to a method for cleaning an air duct, in particular of a rail vehicle, and to an air intake system for routing air and for carrying out such a method.

On account of various environmental influences, such as for example dust, smog and air pollution, technical systems or consumers with an air supply require filter systems. Depending on technical necessities and the prevailing air pollution, the air must be cleaned by filter systems of varying complexity. Depending on the environmental influences and the requirements, filter systems may also be of a multi-stage design.

Depending on the degree of deposition and the number of filter stages, air ducts exist between the filter stages or the filters and the air consumers. Dirt particles can accumulate in the air ducts and thereby clog the air ducts. Although an air filter can reduce an input of dirt particles, such an input can never be avoided. In particular in dusty areas of use, cross sections of the air ducts can be reduced by deposits, whereby a volumetric flow of the air through the air ducts may be impaired. In the worst case, the air ducts may be blocked by contaminants and cause a system failure. The air ducts must consequently be cleaned at regular time intervals. Especially in areas where there is exposure to high levels of dust load, the time intervals for cleaning the air ducts may be short.

For cleaning, the ducts may for example be opened and cleaned manually. However, turbulences causing dust dispersal and resultant adverse effects on the volumetric flow may occur during the cleaning phase of the air ducts. For example, a volumetric flow may quickly increase on account of a larger cross section of a cleaned air duct. A rapid increase in the volumetric flow may have the effect for example that the air-fuel mixture of internal combustion engines becomes leaner for a short time and that the engines are subjected to increased wear. In ventilation systems directing air onto occupants of a vehicle, a sudden increase in a volumetric flow may have adverse effects on the perceived comfort. Since, in unfavorable situations, greater amounts of dust and dirt particles suddenly move at the same time, technical systems may be overloaded for a short time or air filters may become blocked.

Alternatively, automated dust cleaning methods may be used. There is a disclosed solution for the automated cleaning of an air duct in which two air ducts arranged in parallel next to one another are used for supplying a consumer with air. As a result, continuous cleaning of the air supply to the consumer is possible. One air duct can be used for supplying the consumer with air, while the second air duct can be shut off in an automated manner and cleaned. In this way, adverse effects on the consumers due to a cleaning process can be ruled out. Once cleaning of one air duct has been completed, the cleaned air duct can be allowed back into operation and the non-cleaned air duct can be shut off to initiate a cleaning process. Such an arrangement can make optimum cleaning possible, with an air flow that is completely uninfluenced. However, a problematic aspect of this solution is the higher costs, since twice the number of air ducts, with corresponding shut-off devices and cleaning devices, are necessary. Furthermore, such a solution may require a larger installation space.

SUMMARY OF THE INVENTION

The object of the invention is to propose an efficient and inexpensive method for cleaning an air duct and for relieving the load on air filters. The object of the invention is also to propose an air intake system for carrying out such a method.

The object is achieved by the subject matter as claimed. Advantageous design embodiments of the invention are the subject of respectively dependent claims.

According to one aspect of the invention, a method for cleaning an accumulation region in an air duct, in particular of a rail vehicle, is provided. According to the invention, a need for cooling at least one consumer connected to the air duct and a need for cleaning the air duct are ascertained, a cleaning process of the air duct being initiated when there is no or little need for cooling the at least one consumer connected to the air duct and when there is a need for cleaning the air duct.

In this way, at least one region of the air duct can be used as a dust accumulation zone or as an accumulation region. Depositing of dirt particles can be specifically encouraged in this region. Transportation of dirt particles depends on a velocity of an air flow. The higher the velocity of the air flow is, the more dirt particles can be entrained by the air flow. Conversely, in the case of lower velocities of the air flow, fewer dirt particles can be transported by the air flow. The accumulation region may consequently be a region of the air duct that has a larger cross section, whereby a velocity of the air flow can be lower in comparison with a smaller cross section. Consequently, dirt particles can be deposited in regions of the air duct with lower velocities of the air flow. Structuring on walls of the air duct and the geometrical form of the air duct allow additional dispersive turbulences of the air flow to be produced and depositing of the dirt particles to be encouraged.

The at least one consumer may be for example an internal combustion engine. The at least one consumer may also be a ventilation system of a driver's cab or for occupants of a vehicle. An air cooling system for electronic components, such as for example transformers or electric motors, may likewise be a consumer.

Depending on a need for cleaning the air duct, an optimum time for carrying out a cleaning process can be determined on the basis of an ascertainment of a need for cooling the at least one consumer connected to the air duct and a cleaning process of the air duct can be carried out. The cleaning process is only initiated when a velocity of an air flow through the air duct is as low as possible. Preferably, the cleaning process can only be carried out when the air duct has no air flow. As a result, the cleaning process can be carried out depending on the need for clearing the at least one consumer such that an air supply to the at least one consumer is influenced minimally.

Since a cleaning process usually causes dirt particles to be dispersed by turbulence, downstream consumers or filters may be additionally exposed to the load of the dispersed dirt particles. By the method according to the invention, a cleaning process is only carried out when the at least one consumer does not require a supply of air. As a result, automatic cleaning of an air duct can be carried out in such a way that exposure to load of the downstream consumers or filters can be avoided.

The filter and fine-filter systems connected to the air duct can consequently be exposed to less of a load, and therefore have to be maintained or exchanged less often.

The method allows an air duct to be used as a further filter stage in an air routing system. In particular, air ducts that are located in the air routing system can for example be turned into additional filtering components by selective cross-sectional widening or structuring measures. The cross-sectional widening or structuring of an air duct allows accumulation regions for the specific depositing of dirt particles to be produced.

Implementation of a second parallel air duct, with large-volume components for cleaning the air duct in such a way as to avoid exposure to load of the components, is therefore not necessary.

According to one embodiment of the method, when there is no or little need for cooling, an air throughput through the air duct is low or is interrupted. The cleaning process is preferably initiated when there is the lowest possible air flow in the air duct. As a result, dispersive turbulences and uncontrolled exposure of the filters to dust load can be prevented. In addition, a suddenly occurring fluctuation of a volumetric flow of the air with resultant consequences, such as for example the air-fuel mixture of an internal combustion engine becoming leaner, can be avoided.

According to a further exemplary embodiment of the method, the need for cleaning is ascertained by at least one sensor. For example, a sensor may be used for ascertaining the velocity of the air stream through the air duct. Increasing deposits in the air duct may have the effect that velocities of the air flow can change, and can consequently provide information about a degree of contamination of the air duct. Furthermore, ultrasonic sensors for example may be used for locally ascertaining deposition of dirt particles. Sensors allow a need for cleaning to be ascertained quickly and efficiently.

According to a further exemplary embodiment of the method, an existing need for cleaning is automatically signaled at a time interval. The method also allows cleaning processes to be performed at defined time intervals. For this, the need for cleaning may be signaled in a recurring manner after a defined time period, for example by a control unit. When there is a signaled need for cleaning, it may then be necessary to wait for an all-clear for carrying out the cleaning process. The all-clear for this may be issued for example when the at least one consumer connected to the air duct has no or only little need for cooling. When the at least one consumer has no or only little need for clearing, an air flow with a minimal velocity prevails in the air duct. As a result, during a cleaning process, dispersive turbulences and undesired effects on the filters and consumers can be reduced or prevented.

According to a further advantageous exemplary embodiment of the method, the need for cleaning is ascertained on the basis of a loading state of at least one fan. For example, a fan arranged at an inlet of the air duct, for introducing air into the air duct and to the at least one consumer, may be used. Alternatively, a fan arranged at an outlet of the air duct may take in fresh air through the air duct to the at least one consumer. A cross section of the air duct for an air flow routed through the air duct may be reduced by deposits in the air duct. To ensure a constant volumetric flow to the at least one consumer, the fan or number of fans must be operated at a higher power. Consequently, for example, a power consumption of at least one fan may be measured continuously or at regular time intervals. A change in the power required by at least one fan may occur as a result of a need for cleaning, when a defined limit value is exceeded. In this way, a need for cleaning the air duct can be detected without additional sensors. In addition, other operational and physical variables may also be included for ascertaining the need for cleaning the air duct. For example, a dust load of the duct, an ambient temperature and an atmospheric humidity may be taken into consideration in the ascertainment of the need for cleaning the air duct.

According to a further embodiment of the method, the need for cooling is ascertained on the basis of measured values of at least one temperature sensor. For this, at least one consumer connected to the air duct may be thermally monitored. If the consumer is for example an electric motor or other component under load that has to be cooled by an air cooling system, an air flow is produced when defined limit values of the temperature of the component or of the consumer are exceeded. Temperature sensors for monitoring the respective operating temperatures and for controlling the air flow are already present in various consumers. In particular, at least one fan for producing an air flow through the air duct may be put into operation, or a speed of the fan controlled, depending on a temperature of at least one consumer. On the basis of the information of the thermal monitoring of the at least one consumer, a cleaning process of the air duct can be initiated. For example, a cleaning process can only be initiated when a temperature of a consumer has dropped below a limit value and operation of the fan is no longer required. Consequently, a cleaning process can be carried out during operational downtimes of the fan.

According to a further embodiment of the method, the need for cooling is ascertained on the basis of an operating state of the at least one consumer connected to the air duct. In the case of various consumers, continuous ventilation is not necessary. For example, in the case of a locomotive, the traction motors only have to be cooled when the locomotive is in the process of accelerating or regeneratively braking. When the speed of the locomotive is kept constant or in situations where the locomotive is allowed to run down to slowly reduce the speed, air cooling of the traction motors is not required. Such operating states of the at least one consumer may be used for carrying out the cleaning process of the air duct. As a result, a cleaning process can be carried out with care, without influencing the filters or the at least one consumer.

According to a further exemplary embodiment of the method, during the initiated cleaning process, the operating state of the at least one consumer connected to the air duct is set to a reduced cooling need. Preferably, a motor control or a control of the at least one consumer can be connected to a cleaning device. As a result, for example, after an initiated cleaning process, a maximum possible loading of the at least one consumer may be reduced in such a way that an activation of the fan, and consequently production of an air stream in the air duct, is prevented during the cleaning process. It can in this way be ensured during a cleaning process that the dirt particles to be cleaned are not dispersed by an air flow.

According to a further exemplary embodiment of the method, the cleaning process is planned and initiated on the basis of a route profile. As an alternative or in addition to monitoring an operating state of at least one consumer connected to the air duct, an operating state of the at least one consumer may be ascertained from a future or currently traveled route profile. This may be applied for example in the case of a drive motor on the locomotive. In this way, sections of the route during which the locomotive maintains a constant speed, and consequently has a relatively low active need for cooling the drive motors, can be ascertained. Such sections of the route can be used for carrying out the cleaning process. Consequently, an optimum time for carrying out a cleaning process can already be planned in advance.

According to a further aspect of the invention, an air intake system, in particular for a rail vehicle, is provided for routing air and for carrying out the method according to the invention for cleaning an air duct. The air intake system has at least one fan for producing an air stream for cooling at least one consumer and at least one air duct for directing the air stream for cooling the at least one consumer. According to the invention, the at least one air duct has at least one accumulation region for accumulating dirt particles, the at least one accumulation region being automatically cleanable by a cleaning device depending on a need for cooling the at least one consumer.

The at least one fan may produce an air stream for cooling at least one consumer connected to the air duct. The air duct may consist here of one or more sequential air duct segments. In addition, the air duct may have one or more intake regions for directing or taking in the air flow present in the air duct to the at least one consumer. The air duct has at least one accumulation region, in which dirt particles can accumulate. In particular, on account of a local form of the air duct or a local changing of a velocity of the air flow, the dirt particles present in the air stream can be deposited in at least one accumulation region.

At least one cleaning device may preferably be arranged in the at least one accumulation region. Consequently, the at least one cleaning device can effectively remove the deposits of dirt particles. The cleaning device is activated depending on a need for cooling the at least one consumer. Consequently, a cleaning process can preferably be carried out when the ventilation system is switched off. Alternatively, a cooling of the at least one consumer with a small air stream may take place in the air duct during a cleaning process. As a result, dispersive turbulences can be avoided during a cleaning process of the air duct. Arranging cleaning devices in accumulation regions of the air duct allows an installation space requirement of the air intake system to be minimized. By coordinating the cleaning process with the need for cooling the at least one consumer, an optimum time for carrying out the cleaning process can be ascertained. In particular, this allows automated cleaning of the air duct to be ensured without the at least one consumer or a filter being exposed to a load.

If there is inadequate maintenance, an air duct may in the worst case be worn by deposits of dirt particles and lead to a system failure. This case of a fault can be eliminated by automated cleaning of the air duct. Optimally carried out cleaning of the air duct can protect the other components connected to the air duct and increase durability of the filters.

According to an exemplary embodiment of the air intake system, the at least one accumulation region is cleanable depending on a need for cleaning. The cleaning process can preferably only be initiated when there is a need for cleaning. As a result, unnecessary operation of the at least one cleaning device can be prevented and energy can be saved.

According to a further exemplary embodiment of the air intake system, the need for cleaning is dependent on at least one time interval. The need for cleaning may preferably be ascertained at defined time intervals. Thus, regularly recurring intervals for cleaning the at least one accumulation region may be realized.

According to a further exemplary embodiment of the air intake system, the at least one accumulation region is cleanable on the basis of measured values of at least one sensor or a value based on experience. Sensors allow a degree of contamination of the air duct to be ascertained. For example, a need for power of a fan can provide information about a degree of contamination of the air duct. Furthermore, ultrasonic sensors for example may ascertain an increasing deposited layer of dirt particles. As a result, a need for cleaning can be ascertained precisely. Should such experience-based values show that the time for the cleaning process has been chosen unfavorably, other parameters and ambient conditions may be used for finding a suitable cleaning interval. In particular, experience-based values may be empirically ascertained values for assessing and checking an optimum time for initiating a cleaning process.

According to a further exemplary embodiment of the air intake system, the cleaning device cleans the at least one accumulation region by brushes, compressed air and/or negative pressure. The at least one accumulation region may preferably be cleaned by different cleaning devices. For example, deposited dirt particles may be removed from the air duct by compressed air. A cleaning device may also use negative pressure to suck in the deposited dirt particles in the accumulation region and thereby clean the accumulation region. By using automatic brushes, dirt particles in the accumulation region can be removed mechanically. A combination of compressed air and negative pressure may also be used for cleaning at least one accumulation region. As a result, at least one accumulation region can be cleaned particularly quickly and effectively.

According to a further exemplary embodiment of the air intake system, the air intake system has at least one air filter. The air intake system may preferably have at least one air filter. As a result, some of the dirt particles contained in the air stream routed through the air duct can be removed. In particular, sensitive consumers that are connected to the air duct can be protected from dirt particles by additional air filters.

The properties, features and advantages of this invention described above and the manner in which they are achieved will be made more clearly and distinctly comprehensible by the explanation of the following greatly simplified schematic representations of preferred exemplary embodiments. In the figures:

BRIEF DESCRIPTION OF THE SEVERAL VIEWS OF THE DRAWING

In the figures, the same structural elements are provided in each case with the same reference numerals.

DETAILED DESCRIPTION OF THE INVENTION

Figure 1:
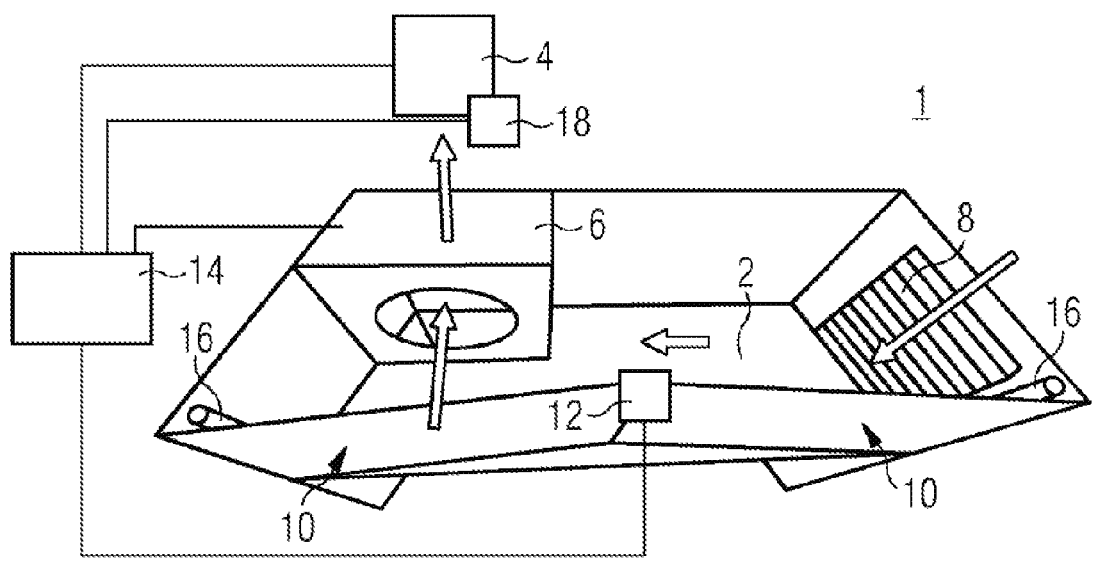
FIG. 1 shows a schematic representation of an air intake system according to a first exemplary embodiment and FIG. 2 shows a schematic flow diagram of a method according to one embodiment.

FIG. 1 shows a schematic representation of an air intake system 1 according to a first exemplary embodiment. The air intake system 1 has an air duct 2 for routing an air stream to a consumer 4. The arrows schematically show here a flow path of the air stream. According to the exemplary embodiment, the consumer 4 is an electric motor 4 or a drive motor 4 of a locomotive, which can be cooled by the air stream. A fan 6 can produce the air stream here. The fan 6 is preferably switched on when there is a need for cooling the consumer 4. The fan 6 takes air from a surrounding area through a filter 8 into the air duct 2 and then directs the air to the consumer 4. The air duct 2 has two accumulation regions 10 for the depositing of dirt particles. A sensor 12 for ascertaining a volumetric flow of the air is arranged in the air duct 2. On the basis of measured values of the sensor 12 and a power requirement of the fan 6, a control unit 14 can ascertain whether the accumulation regions 10 must be cleaned. A cleaning device 16 is respectively arranged in the accumulation regions 10. According to the exemplary embodiment, the cleaning devices 16 are suction-extraction devices, for extracting deposited dirt particles. A cleaning process can advantageously only be initiated when the consumer 4 does not have to be cooled by the fan 6. Alternatively, depending on requirements, initiation of the cleaning process is also possible with an active fan 6. For this, the control unit 14 may evaluate a temperature sensor 18 of the consumer 4. Depending on an operating state of the consumer 4, the temperature of the consumer 4 and a speed of the fan 6, the control unit 14 may ascertain an optimum time for carrying out a cleaning process of the accumulation regions 10. In particular, a cleaning process can only be carried out by the cleaning device 16 when a fan 6 is switched off. As a result, undesired dispersive turbulences of the deposited dirt particles can be avoided.

Figure 2:
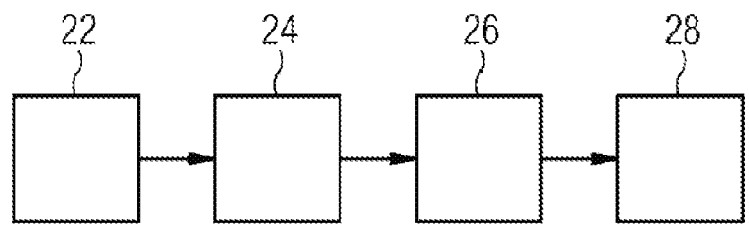

In FIG. 2, a schematic flow diagram of a method 20 according to one embodiment is represented. In a first step, a need for cooling at least one consumer 4 connected to the air duct 2 is ascertained 22. Then, on the basis of at least one sensor 12, a need for cleaning the accumulation regions 10 of the air duct 2 is ascertained 24. On the basis of the ascertained cooling need, in the event of a cleaning need being established it is checked when a cleaning process can be carried out 26 by the cleaning devices 16. If there is little or no need for cooling the at least one consumer 4 connected to the air duct 2, no air stream or only a small air stream is produced in the air duct 2, so that cleaning of the accumulation regions 10 can be carried out with care 28.

Although the invention has been more specifically illustrated and described in detail by the preferred exemplary embodiments, the invention is not restricted by the disclosed examples and other variations can be derived herefrom by a person skilled in the art without departing from the scope of protection of the invention.

The invention claimed is:

1. A method for cleaning an air duct of a rail vehicle, the air duct extending between an air filter and a fan for generating an air flow for cooling at least one consumer connected to the air duct, the method comprising:
ascertaining whether there exists a need for cooling the at least one consumer connected to the air duct for cooling, the need for cooling being ascertained on a basis of measured values of at least one temperature sensor disposed to thermally monitor the at least one consumer connected to the air duct;
ascertaining with at least one sensor whether there exists a need for cleaning the air duct between the air filter and the fan;
when a need for cleaning the air duct exists, initiating and carrying out an automated cleaning process only if a need for cooling the at least one consumer connected to the air duct does not exist, and the at least one consumer consequently does not require a supply of air;
using at least one region of the air duct as an accumulation region, the accumulation region having a larger cross section than a remaining air duct, wherein a velocity of an air flow in the accumulation region is lower in comparison with the velocity of the air flow in the remaining air duct with a smaller cross section, and specifically encouraging a deposition of dirt particles in the accumulation region, and wherein walls of the air duct in the accumulation region have a structuring and a geometrical form to enable additional dispersive turbulences of the air flow to be produced, in order to specifically encourage the deposition of the dirt particles in the accumulation region; and
cleaning the air duct by cleaning the accumulation region with a cleaning device arranged in the accumulation region, and thereby activating the cleaning device if the need for cooling the at least one consumer connected to the air duct does not exist.

2. The method according to claim 1, which comprises, when the need for cooling does not exist, setting an air throughput through the air duct to low or interrupting the air throughput.

3. The method according to claim 1, which comprises ascertaining the need for cleaning on a basis of a loading state of at least one fan.

4. The method according to claim 1, which comprises ascertaining the need for cooling on a basis of an operating state of the at least one consumer connected to the air duct.

5. An air intake system for a rail vehicle, the air intake system comprising:
a fan for producing an air stream for cooling a consumer;
an air filter;
an air duct for routing the air stream for cooling the consumer, the air duct extending between said air filter and said fan for producing the air flow for cooling the consumer, the consumer being connected to said air duct;
a temperature sensor for thermally monitoring the consumer connected to said air duct, wherein said temperature sensor is used to ascertain a need for cooling the at least one consumer connected to said air duct on a basis of measured values provided by said temperature sensor;
a sensor configured for ascertaining a need for cleaning the air duct;
said air duct being formed with an accumulation region having a larger cross-sectional area than a remainder of said air duct, wherein a velocity of an air flow in the accumulation region is lower in comparison with the velocity of the air flow in the remainder of the air duct with a smaller cross section, to specifically encourage depositing of dirt particles in the accumulation region, and wherein the accumulation region of the air duct has walls formed with structuring and said air duct has a specific geometrical shape to enable additional dispersive turbulences of the air flow to be produced, in order to specifically encourage depositing of the dirt particles; and
a cleaning device configured for cleaning said air duct in the accumulation region, wherein said cleaning device is activated for carrying out an automated cleaning process when there is a need for cleaning the air duct, and the cleaning process is only initiated and carried out when the at least one consumer connected to the air duct does not have a need for cooling, and consequently does not require a supply of air.

6. The air intake system according to claim 5 configured for routing air and for carrying out the method according to claim 1.

7. The air intake system according to claim 5, wherein said cleaning device is configured to clean said accumulation region with brushes, with pressurized air, and/or with negative pressure.

* * * * *